United States Patent [19]

Moyer

[11] Patent Number: 4,458,523

[45] Date of Patent: Jul. 10, 1984

[54] COOLING SYSTEM PRESSURE TESTER

[75] Inventor: Robert G. Moyer, Bloomfield, Conn.

[73] Assignee: Union Carbide Corporation, Danbury, Conn.

[21] Appl. No.: 363,833

[22] Filed: Mar. 31, 1982

[51] Int. Cl.³ ............................................. G01M 3/04
[52] U.S. Cl. ................................................... 73/49.7
[58] Field of Search ................. 73/40, 49.7, 49.8, 118

[56] References Cited

U.S. PATENT DOCUMENTS

| | | | |
|---|---|---|---|
| 2,539,189 | 1/1951 | Garrett | 73/40 X |
| 2,760,367 | 8/1956 | Stromberg | 73/40 |
| 3,014,361 | 12/1961 | Black | 73/40 |
| 3,022,658 | 2/1962 | Black | 73/40 |
| 3,090,221 | 5/1963 | Cosby | 73/40 |
| 3,561,255 | 2/1971 | Kostielney, Jr. | 73/40 |
| 3,650,147 | 3/1972 | Moyer | 73/49.7 |
| 4,068,690 | 1/1978 | Wyman | 141/95 |
| 4,126,161 | 11/1978 | Sterling | 141/95 |

*Primary Examiner*—Jerry W. Myracle
*Attorney, Agent, or Firm*—Dale Lynn Carlson

[57] ABSTRACT

A cooling system pressure tester is provided which allows consumers to determine the approximate vent pressure of their automotive cooling system, as well as to check for leaks in the system. The device includes a connecting and restriction element for introducing water into the system and an adjustable pressure relief valve for limiting the maximum pressure.

2 Claims, 6 Drawing Figures

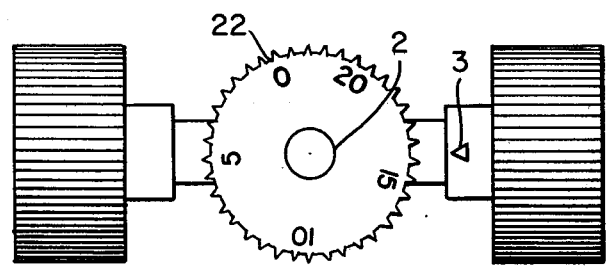
FIG. IA
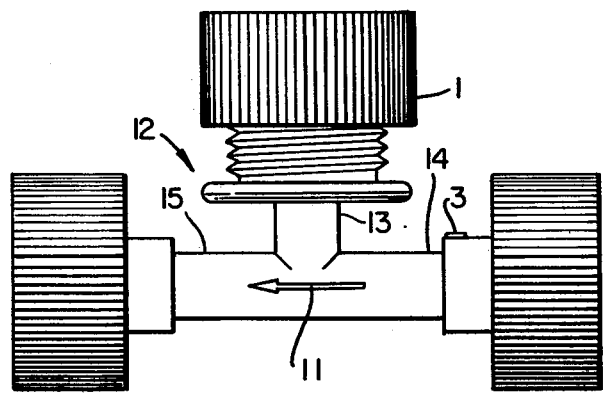
FIG. IB
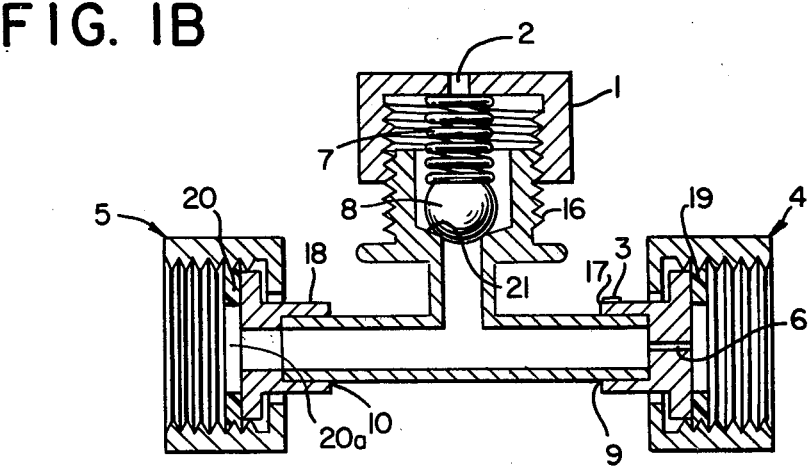
FIG. IC

COOLING SYSTEM PRESSURE TESTER

BACKGROUND OF THE INVENTION

This invention relates to a pressure tester for automotive engine cooling systems and a method for pressure testing such systems.

The cooling system of conventional automobiles comprises a radiator, an engine block having flow paths therein and a water pump which are all connected by conduits for circulating coolant. The water pump is usually attached to the lower front of the engine and communicates with the flow paths therein. In general, a lower radiator conduit connects the water pump and the bottom of the radiator, and an upper radiator conduit connects the upper end of the engine flow paths and the top of the radiator, thereby effecting a complete flow circuit through the engine and the radiator. A thermostat is usually placed in the cooling system at the top of the engine near the upper radiator conduit to block water circulation when the engine is operating below desired temperatures.

A heater is also included in the cooling system of most automobiles, and is generally located near or in the interior of the automobile. The heater is usually connected to the other parts of the cooling system by a heater-supply conduit slipped tightly over a nipple fitted in a heater supply aperture on the top of the engine and over a nipple on the heater, and by a heater-return conduit connected to the heater and emptying into the water pump.

It is well known that automotive cooling systems should be pressure tested periodically in order to detect leaks in the system. As the engine temperature rises during operating the temperature of the coolant in the system will also rise. Since the cooling system is completely enclosed, the pressure within the system will rise in relation to the temperature rise of the coolant. Minor leaks present in the system may result in excessive loss of coolant as the pressure rises in the system. The more coolant that is lost, the less capability the cooling system has for keeping the engine temperature from rising above a normal operating level. This could result in engine overheating and damage to the engine parts.

The common method of pressure testing an automotive cooling system utilizes a hand operated air pump which is attached to the radiator filler neck after the radiator cap has been removed. Air is pumped into the cooling system until the desired pressure level is attained. The pressure level is usually indicated by a gauge attached to the air pump. The cooling system is checked for leakage by observing the gauge indicator. If the indicator holds steady at the test pressure level, normally the usual operating pressure of the system, this would indicate that the system will hold pressure and therefore there are no leaks. If the gauge indicator drops from the test pressure level, this would indicate a loss in pressure and therefore a leak. If a leak is indicated an inspection of the cooling system is made for escaping liquid.

The radiotor cap "opening pressure" is tested separately by attaching the cap onto a special adapter for pressurizing with the same hand pump. The pressure is increased until the pump pressure gauge indicates the cap opening pressure by a sudden drop in the pressure. The actual pressure at which the cap will release is then compared to the cap set pressure, i.e., the pressure at which the cap is supposed to open, to determine if the pressure cap is functioning properly.

It will be seen that in utilizing the above method for pressure testing an automotive engine cooling system the radiator cap must be pressure tested independently of the rest of the engine cooling system. As a consequence, this method has proved to be very time consuming. It is also not totally accurate in giving a true picture of the pressure reliability of an engine cooling system under normal operating conditions, since the test procedure does not indicate whether the radiator cap is seated properly on the radiator filler neck. Unless the radiator cap is seated properly on the radiator filler neck, leakage will occur under cooling system operating conditions. Therefore, it is essential that the radiator cap be pressure tested while in place on the filler neck seat in order to insure the pressure integrity of the whole engine cooling system.

A radiator overflow tube is normally provided in an automotive engine cooling system. One end of the tube is affixed to the radiator filler neck in such a manner that when the pressure in the system builds up above the cap opening pressure, the main valve in the cap will lift off its seat and allow the pressure to release through an outlet in the filler neck to which is attached the overflow tube. The other end of the tube vents to the atmosphere. It is essential to check the radiator overflow tube for blockage to insure safe operation of the cooling system. In the event that pressure must be released the tube must be clear to prevent serious damage to the cooling system. When using the method described herein above, the pressure release capability of the radiator overflow tube is not tested. The hand operated air pump is attached in such a manner to the radiator filler neck that the outlet to the radiator overflow tube is covered by the pump mechanism during the test.

If a leak is indicated using the hand operated air pump and gauge, it is not always readily ascertainable where the leak is located. The normal engine cooling system is liquid filled except for a small volume of air located at the top of the radiator, the highest point in the system. The air pressure in this portion of the radiator is increased by the hand pump which is connected to the radiator filler neck at the top of the radiator. Therefore, any leak which may occur in the air-filled section of the radiator can only be detected by the presence of escaping air which cannot be observed by a visual inspection.

U.S. Pat. No. 3,650,147 which issued on Mar. 21, 1972 to Robert G. Moyer, entitled "Cooling System Pressure Tester" discloses a cooling system pressure tester wherein the pressure is allowed to rise slowly as it is observed on a pressure gauge and when the pressure reaches the desired level, the high pressure water supply is manually shut off by a valve. In the present invention, on the other hand, the pressure rise is generally not observed because a gauge is not required.

OBJECT OF THE INVENTION

It is therefore, an important object of this invention to provide an improved pressure tester for an automotive engine cooling system which is more reliable and easier to use than those presently available.

A more specific object of this invention is to provide an improved pressure tester for an automotive engine cooling system which does not require that the radiator cap be removed and pressure tested separately.

Another object of this invention is to provide an improved pressure tester for an automotive engine cooling system which is capable of testing the pressure release capability of the radiator overflow tube.

Another object of this invention is to provide a pressure tester for an automotive engine cooling system which will hydraulically pressure test the entire cooling system.

A further object of this invention is to provide a convenient and effective method of pressure testing an automotive engine cooling system which is capable of testing the entire cooling system under normal operating conditions.

It is still another object of the invention to provide an adjustable means of pressurizing a cooling system so that the operator can choose a maximum test pressure compatible with the system even though the supply pressure is higher.

SUMMARY OF THE INVENTION

This invention relates to a pressure tester for pressure testing an entire automotive engine cooling system that is fully assembled, wherein the system includes an engine block, a heater, a heater-supply conduit connected between the engine block and heater, a radiator provided with a radiator cap in place on the radiator's filler neck, and means for connecting the engine block, heater, heater-supply conduit and radiator for circulating coolant therethrough; the pressure tester means comprising:

(a) a water conduit fitting connected between a source of pressurized water and an inlet opening in the engine cooling system; and (b) a means for controlling the flow of water through the water conduit fitting and into the opening. The above-mentioned inlet opening in the engine cooling system is preferably proximate to the heater-supply conduit. The preferred means for controlling the flow of water through the water conduit fitting is a means selected from the group consisting of an orifice plate, a pressure relief valve and a capillary tube.

In another embodiment of the invention, the above described pressure tester further comprises a means for establishing a maximum allowable water pressure in the water conduit whereby water pressure venting will take place if the maximum allowable water pressure is exceeded, preferably comprising a spring adjustable pressure relief valve or a rupture disk, wherein the relief valve preferably contains a pressure adjustment knob for varying the spring compression to achieve the desired relief pressure.

Another aspect of the invention relates to a method for pressure testing an automotive engine cooling system employing the above-described pressure tester, the engine cooling system including an engine block, a heater, a heater-supply conduit connected between the engine block and heater, and a radiator provided with a radiator cap, which method comprises:

(a) pumping water into the engine cooling system through an opening in the heater-supply conduit intermediate the engine block and heater and with the radiator cap in place on the radiator until the engine cooling system is hydraulically full;

(b) increasing the hydraulic pressure in the cooling system until the desired test pressure is reached to locate any leaks in the system by visual inspection;

(c) releasing the pressure in the engine cooling system.

Another embodiment of the above-described method comprises, after step (b), the additional step of increasing the hydraulic pressure in the cooling system up to approximately the rated pressure for the cap and visually inspecting the cap for proper functioning.

DETAILED DESCRIPTION OF THE INVENTION

In accordance with the present invention there is provided a cooling system pressure tester preferably comprising a tee having a side branch, a first end branch and a second end branch. The first and second end branches have fittings respectively associated therewith for connection respectively with a source of water and the cooling system of an automobile. The first end branch has a restriction orifice located therewithin for limiting the flow rate of test fluid, such as water, antifreeze, or mixtures thereof, through the pressure tester. The side branch preferably has a spring and ball pressure relief valve located therewithin (although other types of relief valves such as a diaphram valve, needle valve, rupture disk, and the like can be used if desired) and preferably has a pressure adjustment knob for varying the spring compression to achieve desired relief pressures. The pressure adjustment knob, if used, preferably has a vent hole located therein for venting of fluid when the spring and ball relief valve opens, although the vent hole can be external to the pressure adjustment knob.

The preferred embodiments of the invention will become more clear when considered together with the accompanying drawings which are set forth as being merely illustrative of the invention and are not intended to be limitative thereof and wherein:

FIGS. 1A–1C are views of one embodiment of this invention having female fittings at both ends of the pressure tester, and wherein:

FIG. 1A is a top view thereof;

FIG. 1B is a side elevation view thereof; and

FIG. 1C is a cross sectional view thereof.

FIGS. 2A–2C are views of a second embodiment of this invention having a female fitting at one end of the pressure tester and a male fitting at the opposite end, and wherein:

FIG. 2A is a top view thereof;

FIG. 2B is a side elevational view thereof; and

FIG. 2C is a cross sectional view thereof.

Figure 2A:
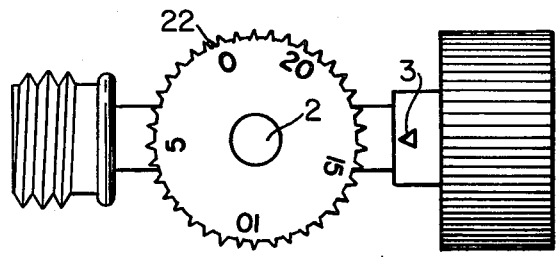
Figure 2B:
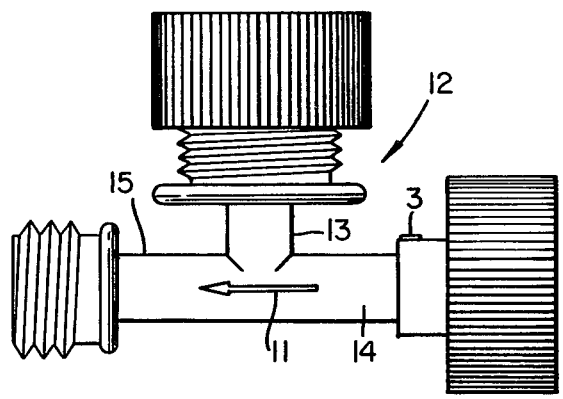
Figure 2C:
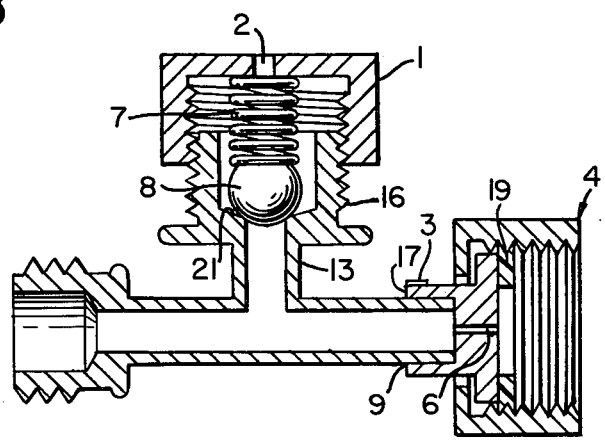

The end connections of the cooling pressure tester tee may be adapted for a particular use. One embodiment shown in FIGS. 1A–C has female hose connections on both ends for directly connecting a garden hose to the pressure tester and the pressure tester to a flushing tee in the heater hose circuit. Alternatively, the pressure tester could have a flushing tee incorporated into the pressure tester of the invention. Another embodiment shown in FIGS. 2A–C can have one male end to permit connection to a backflow preventer intended for use in some states, in particular, California. Of course, both ends could have male hose connections if those fittings are necessary.

In the cooling system pressure tester of this invention the pressure is limited by the amount of compression of the spring when the adjustment knob is screwed down tight onto the tester body. The actual dimensioning of the parts to provide a limiting pressure is a matter of design related to the spring size and the diameter of the part under the ball. Of course, the purpose of limiting the pressure is to protect the cooling system from damage that could occur if water line pressure were excessive. Therefore, design of the spring and ball pressure relief valve, if used, should be such that the operator will not damage the system if the adjustment knob is screwed down tight.

Water entering the pressure tester would be restricted by the restiction orifice to a low flow rate. Since the cooling system would be closed by virtue of the fact that the radiator cap would be in place on the radiator fill-neck, pressure would build up in the system. When the pressure acting on the ball is sufficient to overcome the compressive force of the spring, the ball will lift off its seat and liquid will escape through the vent hole. System pressure will then be the same as the pressure to cause venting and will be settable by the adjusting knob.

The automobile cooling system pressure tester connects a source of water, for example, through a garden hose to a flushing tee which is conventionally located in the heater inlet hose of the car. The water enters the cooling system, which is closed since the radiator cap is in place over the radiator fill-neck, through a small restriction orifice or conduit so that the volume of flow would be very low such as one or two pints per minute. The pressure tester also has an adjustable relief valve so that the maximum pressure would be typically limited to 20 pounds per square inch gauge pressure.

FIGS. 1A-1C shows one embodiment of the cooling system pressure tester of this invention having female fittings at both ends of the pressure tester. The following detailed description except for the combination of end fittings applies also to FIGS. 2A-2C which show a second embodiment differing only by the use of a male fitting at one end and a female fitting at the opposite end. With reference to FIGS. 1A-1C, a tee 12 having a side branch 13 and a first end branch 14 and a second end branch 15 is provided with a male fitting 16 connected to the side branch 13, and female fittings 4, 5 respectively connected to first end branch 14 and second end branch 15 by means of first and second sleeve elements 17, 18 respectively. The sleeve elements 17, 18 at points 9, 10 respectively may be secured to the respective tee end branches 14, 15 by gluing, welding, screwing, and the like dependent upon the material and nature of the fittings. If plastic is used gluing may be employed. Gaskets 19, 20 are provided for ensuring a tight seal when the pressure tester is used. First sleeve element 17 is provided with a restrictive orifice 6 for limiting the flow of water which enters the pressure tester through it. Second sleeve element 18 through which the water exits the pressure tester has an opening 20 substantially larger than the restriction orifice 6 of first sleeve element 17. Side branch 13 is provided with a spring 7 and ball 8 pressure relief valve, the ball 8 which can be plastic or metal, resting when pressure is not being relieved, on the internal rim 21 of the male fitting 16. When the pressure inside the pressure tester is sufficient to overcome the opposite force of the spring 7, the ball 8 lifts and water is vented through vent hole 2 through the pressure adjustment knob I rotatably secured around the end portion of male fitting 16. One end of the spring 7 is in contact with the ball 8 and the other end of the spring is in contact with the inside of top of the pressure adjustment knob 1. The pressure adjustment knob 1 is provided with insignia 22 to designate the pressure setting and an index marker 3 is provided on first sleeve element 17. At the maximum pressure setting the pressure adjustment knob 1, when screwed down to provide maximum compression in the spring 7, bottoms against the end of male fitting 16. The tee 12 is provided with an external direction arrow 11 to indicate the direction of water flow through the pressure tester.

The pressure tester of this invention can, for example, be used as follows: Immediately after flushing the cooling system with a garden hose, the garden hose is disconnected from the fitting (e.g., a double female coupling and/or backflow preventer as the case may be) attached to the flushing tee. The pressure tester is then attached to the garden hose at the end having the restriction orifice and at the other end is attached to the fitting attached to the flushing tee. The radiator cap is placed on the radiator. The pressure adjustment knob on the pressure tester is set to its lowest value. The water is turned on so that it enters the cooling system and vents from the pressure tester's relief valve orifice (vent). The pressure adjustment knob is set of a pressure at least one pound per square inch below the automobile radiator cap's rating, which is typically printed on the cap. The radiator overflow hose is inspected to see if the radiator cap is venting. It should not be. The pressure adjustment knob on the pressure tester is next set to the radiator cap's rating pressure. The radiator cap should be venting. The cooling system is now inspected for leaks at hose connections and at the radiator. When the pressure adjustment knob on the pressure tester is backed off, the radiator cap should stop venting.

While the invention is particularly useful for pressure testing an automobile cooling system, it may also be used or adapted for testing the cooling systems of other vehicles, machines or devices.

Although the present invention has been described and set forth in some detail, it should be further understood that the same is susceptible of changes, modifications and variations without departing from the scope and spirit of the invention.

I claim:

1. A pressure tester for pressure testing an entire automotive engine cooling system that is fully assembled, wherein said system includes an engine block, a heater, a heater-supply conduit connected between said engine block and heater, a radiator provided with a radiator cap in place on the radiator's filler neck, and means for connecting said engine block, heater, heater-supply conduit and radiator for circulating coolant therethrough; said pressure tester means comprising:
   (a) a water conduit fitting connected between a source of pressurized water and an inlet opening in said engine cooling system;
   (b) a means for controlling the flow of water through said water conduit fitting and into said opening; and
   (c) a means for establishing a maximum allowable water pressure in said engine cooling system whereby water pressure venting will take place if said maximum allowable water pressure is exceeded, wherein component (c) comprises a spring-adjustable pressure relief valve provided with a pressure-adjustment knob with pressure setting insignia, said pressure adjustment knob being adapted for varying spring compression to achieve the desired relief pressure.

2. A method for pressure testing an automotive engine cooling system employing the pressure tester of claim 1, said engine cooling system including an engine block, a heater, a heater-supply conduit connected between said engine block and heater, and a radiator provided with a radiator cap; which method comprises:
(a) pumping water into said engine cooling system through an opening in said heater-supply conduit intermediate said engine block and heater and with said radiator cap in place on said radiator until said engine cooling system is hydraulically full;
(b) increasing the hydraulic pressure in said cooling system until the desired test pressure is reached to locate any leaks in said system by visual inspection; and then, increasing the hydraulic pressure in said cooling system up to approximately the rated pressure for said cap and visually inspecting said cap for proper functioning; and then,
(c) releasing the pressure in said engine cooling system.

* * * * *